US012234982B1

(12) United States Patent
Wang

(10) Patent No.: US 12,234,982 B1

(45) Date of Patent: Feb. 25, 2025

(54) CRYSTAL BALL ORNAMENT

(71) Applicant: Lixuan Wang, Heyuan (CN)

(72) Inventor: Lixuan Wang, Heyuan (CN)

(*) Notice: Subject to any disclaimer, the term of this patent is extended or adjusted under 35 U.S.C. 154(b) by 0 days.

(21) Appl. No.: 18/885,315

(22) Filed: Sep. 13, 2024

(30) Foreign Application Priority Data

Aug. 7, 2024 (CN) ......................... 202421911378.2

(51) Int. Cl.

| | |
|---|---|
| ***G04B 47/04*** | (2006.01) |
| ***F21V 3/02*** | (2006.01) |
| ***F21V 17/08*** | (2006.01) |
| *F21Y 115/10* | (2016.01) |

(52) U.S. Cl.

CPC ................ *F21V 3/02* (2013.01); *F21V 17/08* (2013.01); *G04B 47/04* (2013.01); *F21Y 2115/10* (2016.08)

(58) Field of Classification Search

CPC ............................ G04B 47/04; F21Y 2115/10

See application file for complete search history.

(56) References Cited

U.S. PATENT DOCUMENTS 7,149,152 B1 * 12/2006 Chan ...................... G03B 29/00 368/79

D948,105 S * 4/2022 Wu .............................. D26/104

D1,039,391 S * 8/2024 Zeng .............................. D26/54

2004/0055190 A1 * 3/2004 Liu ........................ G09F 19/02 40/406

2021/0164628 A1 * 6/2021 Zheng ..................... F21V 5/005

2022/0068171 A1 * 3/2022 Yang ..................... G09F 13/005

* cited by examiner

*Primary Examiner* — Evan P Dzierzynski

(57) ABSTRACT

The present disclosure provides an ornament, including: a crystal ball; and a support seat, the support seat being provided with a bearing portion, and a bearing recess and a mounting opening being provided in the top of the bearing portion, wherein the bearing recess receives at least part of a lower portion of the crystal ball, and the mounting opening is located at the top of the bearing recess, is in communication with the bearing recess, and allows at least part of the lower portion of the crystal ball to enter and exit the bearing recess vertically; and the support seat having a mounting hole running through the support seat from front to rear, wherein the mounting hole is located above the bearing recess, is in communication with the bearing recess via the mounting opening, and receives a remaining portion of the crystal ball exposed from the bearing recess, a distance between a hole wall part of the mounting hole at the highest point and the mounting opening being smaller than a diameter of the crystal ball.

10 Claims, 7 Drawing Sheets

CRYSTAL BALL ORNAMENT

TECHNICAL FIELD

The present disclosure relates to the technical field of decorations, and in particular, to an ornament.

BACKGROUND ART

A light-emitting ornament is generally composed of a support seat and a crystal ball. A first circuit board and an LED lamp electrically connected to the first circuit board are arranged on the support seat, and the crystal ball is arranged on the support seat and opposite to the LED lamp so as to allow light emitted by the LED lamp to irradiate on the crystal ball. The crystal ball is made of a special material that can absorb and reflect the light, thereby exciting fluorescent substance inside to emit rays of light, which can provide a decorative effect or can be used as a nightlight.

SUMMARY OF THE INVENTION

An embodiment of the present disclosure provides an ornament, including:

a crystal ball; and a support seat, the support seat being provided with a bearing portion, and a bearing recess and a mounting opening being provided in the top of the bearing portion, wherein the bearing recess receives at least part of a lower portion of the crystal ball, and the mounting opening is located at the top of the bearing recess, is in communication with the bearing recess, and allows at least part of the lower portion of the crystal ball to enter and exit the bearing recess vertically; and the support seat having a mounting hole running through the support seat from front to rear, wherein the mounting hole is located above the bearing recess, is in communication with the bearing recess via the mounting opening, and receives a remaining portion of the crystal ball exposed from the bearing recess, a distance between a hole wall part of the mounting hole at the highest point and the mounting opening being smaller than a diameter of the crystal ball.

The above description is merely presented for the purpose of the specification, and is not intended to limit the present disclosure in any way. In addition to the above illustrative aspects, implementations and features, further aspects, implementations and features of the present disclosure will become readily apparent with reference to the accompanying drawings and the following detailed description.

BRIEF DESCRIPTION OF THE DRAWINGS

In figures, the same reference signs denote the same or similar components or elements throughout multiple figures unless otherwise specified. These figures are not necessarily drawn to scale. It should be understood that these figures depict only some implementations according to the present disclosure and are not to be construed as limiting the scope of the present disclosure.

LIST OF REFERENCE SIGNS

Figure 1:
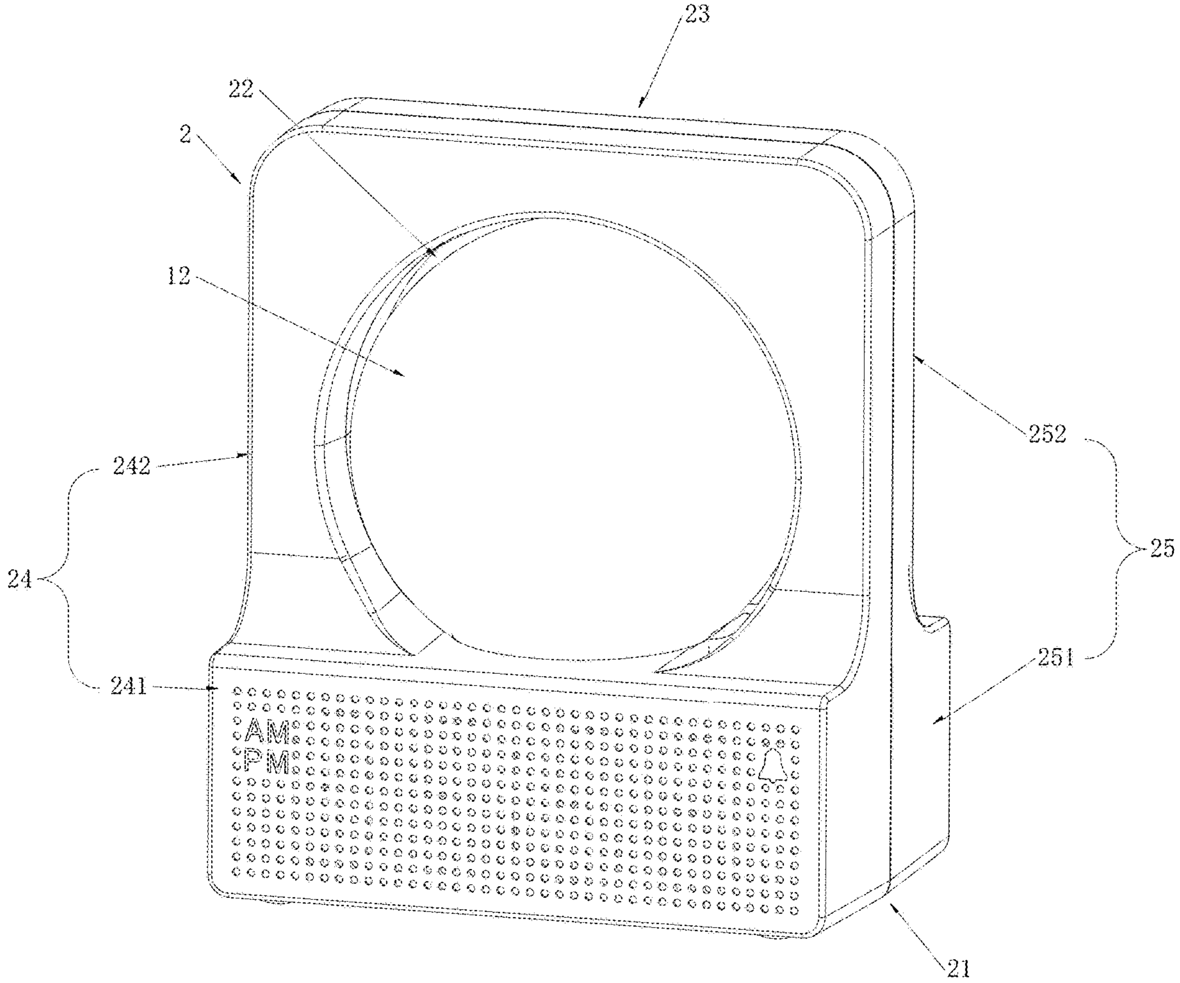
FIG. 1 is a schematic perspective view of the structure of an ornament according to an embodiment of the present disclosure from a first perspective.
Figure 2:
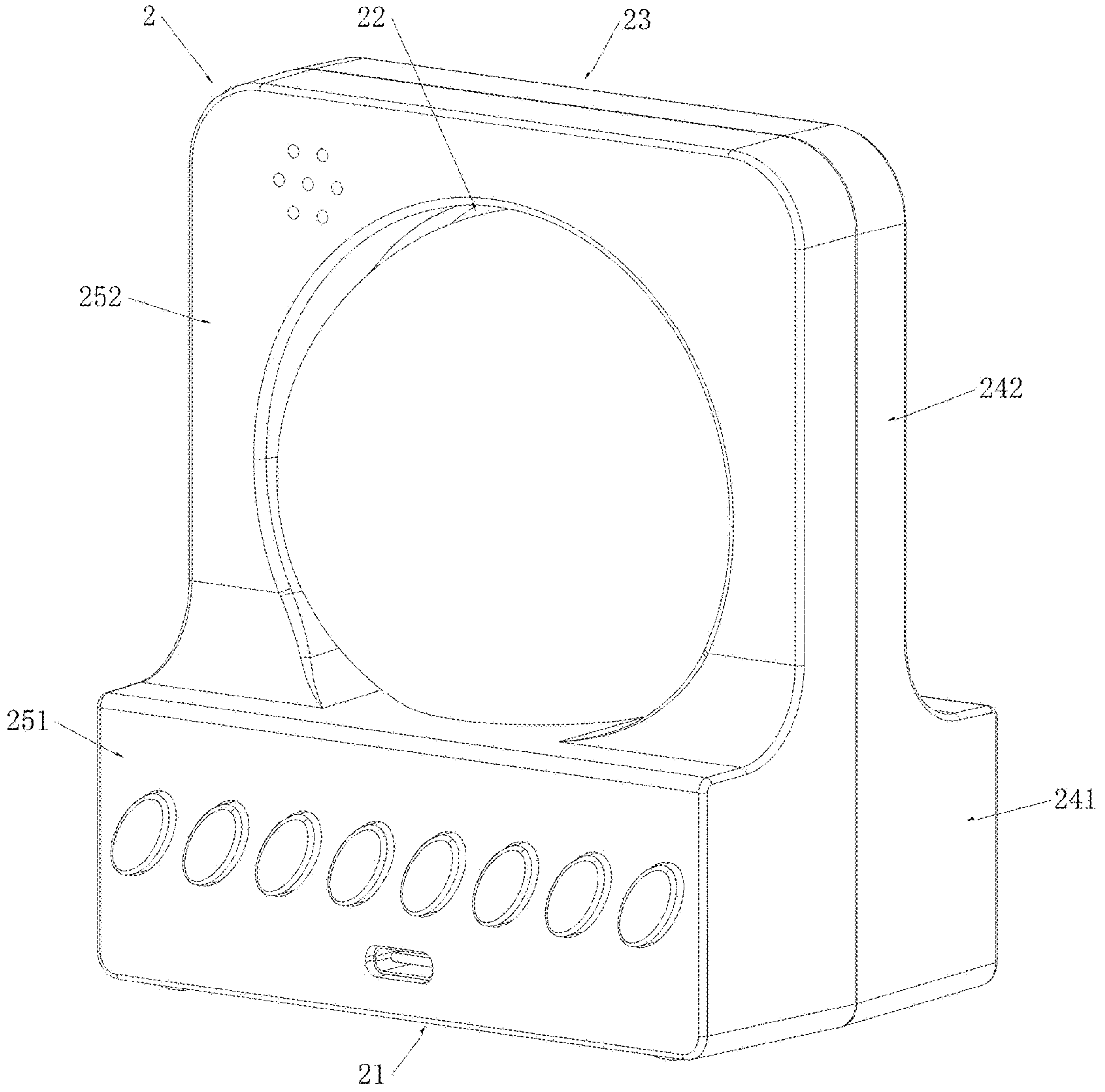
FIG. 2 is a schematic perspective view of the structure of the ornament according to an embodiment of the present disclosure from a second perspective.

1. Crystal ball; 11. Lower portion of crystal ball; 12. Remaining portion; 13. Front portion; 14. Rear portion; 2. Support seat; 21. Bearing portion; 211. Bearing recess; 212. Mounting opening; 213. Mounting groove; 214. Mounting cavity; 22. Mounting hole; 221. Hole wall part; 23. Connecting ring; 24. Front half; 241. Front lower portion; 2411. Light-transmitting hole; 242. Front upper portion; 25. Rear half; 251. Rear lower portion; 252. Rear upper portion; 3. First circuit board; 4. LED lamp bead; 5. Second circuit board; 6. Display; 7. Battery case; 71. Battery compartment; 8. Compartment cover.

DETAILED DESCRIPTION OF EMBODIMENTS

Only some exemplary embodiments will be briefly described below. As can be appreciated by those skilled in the art, modifications may be made to the described embodiments in various ways without departing from the spirit or scope of the present disclosure. Therefore, the drawings and the description are considered as exemplary in nature rather than limiting.

FIGS. 1-7 show an ornament according to a preferred implementation of the present disclosure. The ornament includes:

a crystal ball 1; and a support seat 2, the support seat 2 being provided with a bearing portion 21, and a bearing recess 211 and a mounting opening 212 being provided in the top of the bearing portion 21, wherein the bearing recess 211 receives at least part of a lower portion 11 of the crystal ball, the mounting opening 212 is located at the top of the bearing recess 211, the mounting opening 212 is in communication with the bearing recess 211, and the mounting opening 212 allows at least part of the lower portion 11 of the crystal ball to enter and exit the bearing recess 211 vertically; and the support seat 2 having a mounting hole 22, wherein the mounting hole 22 runs through the support seat 2 from front to rear, the mounting hole 22 is located above the bearing recess 211, the mounting hole 22 is in communication with the bearing recess 211 via the mounting opening 212, and the mounting hole 22 receives a remaining portion 12 of the crystal ball 1 exposed from the bearing recess 211, a distance h between a hole wall part 221 of the mounting hole 22 at the highest point and the mounting opening 212 being smaller than a diameter of the crystal ball 1.

In the ornament according to an embodiment of the present disclosure, the bearing recess 211 is provided on the bearing portion 21, and the bearing recess 211 can allow insertion of at least part of the lower portion 11 of the crystal ball so as to bear the crystal ball 1, so that the crystal ball 1 is stably placed on the support seat 2. In addition, since the mounting hole 22 runs through the support seat 2 from front to rear, and the mounting hole 22 receives the remaining portion of the crystal ball 1 exposed from the bearing recess 211, it is possible to expose a front portion 13 and the outside of the crystal ball 1 from the support seat 2. Moreover, since the distance h between the hole wall part 221 of the mounting hole 22 at the highest point and the mounting opening 212 is smaller than the diameter of the crystal ball 1, when the crystal ball 1 is disengaged upwardly from the bearing recess 211 by accidental touching, it is possible to restrain the crystal ball 1 from disengaging from the support seat 2 in a front-rear direction, such that the crystal ball 1 is prevented from falling and damaging or injuring a user, thereby improving the safety of use.

In an implementation, the mounting hole 22 has a larger diameter than the crystal ball 1, and the mounting hole 22 allows the crystal ball 1 to enter and exit laterally from the support seat 2, that is, when the crystal ball 1 needs to be removed, the crystal ball 1 may be first lifted up, and then a pushing force in the front-rear direction is applied to the crystal ball 1 until the crystal ball 1 is disengaged from the mounting hole 22. When the crystal ball 1 is to be mounted, the crystal ball 1 may be first aligned with the mounting hole 22, then a pushing force in the front-rear direction is applied to the crystal ball 1 until the crystal ball 1 is placed in the mounting hole 22, and finally, at least part of the lower portion 11 of the crystal ball is inserted into the bearing recess 211 under the action of its own gravity, such that tool-less removal and mounting of the crystal ball 1 can be achieved, facilitating easy removal and mounting, and facilitating replacing the crystal ball 1 or adapting the ornament to different types of crystal ball 1.

Referring to FIG. 1, in an implementation, the support seat 2 is further provided with a connecting ring 23, the connecting ring 23 being arranged on the top of the bearing portion 21. The connecting ring 23 is arranged around an axial centerline of the mounting hole 22, and the connecting ring 23 and the bearing portion 21 enclose the mounting hole 22. Since the connecting ring 23 and the bearing portion 21 enclose the mounting hole 22, the support seat 2 is formed as a structure having relatively high structural strength, which is less prone to damage, such that the crystal ball 1 can be stably placed on the support seat 2.

Figure 3:
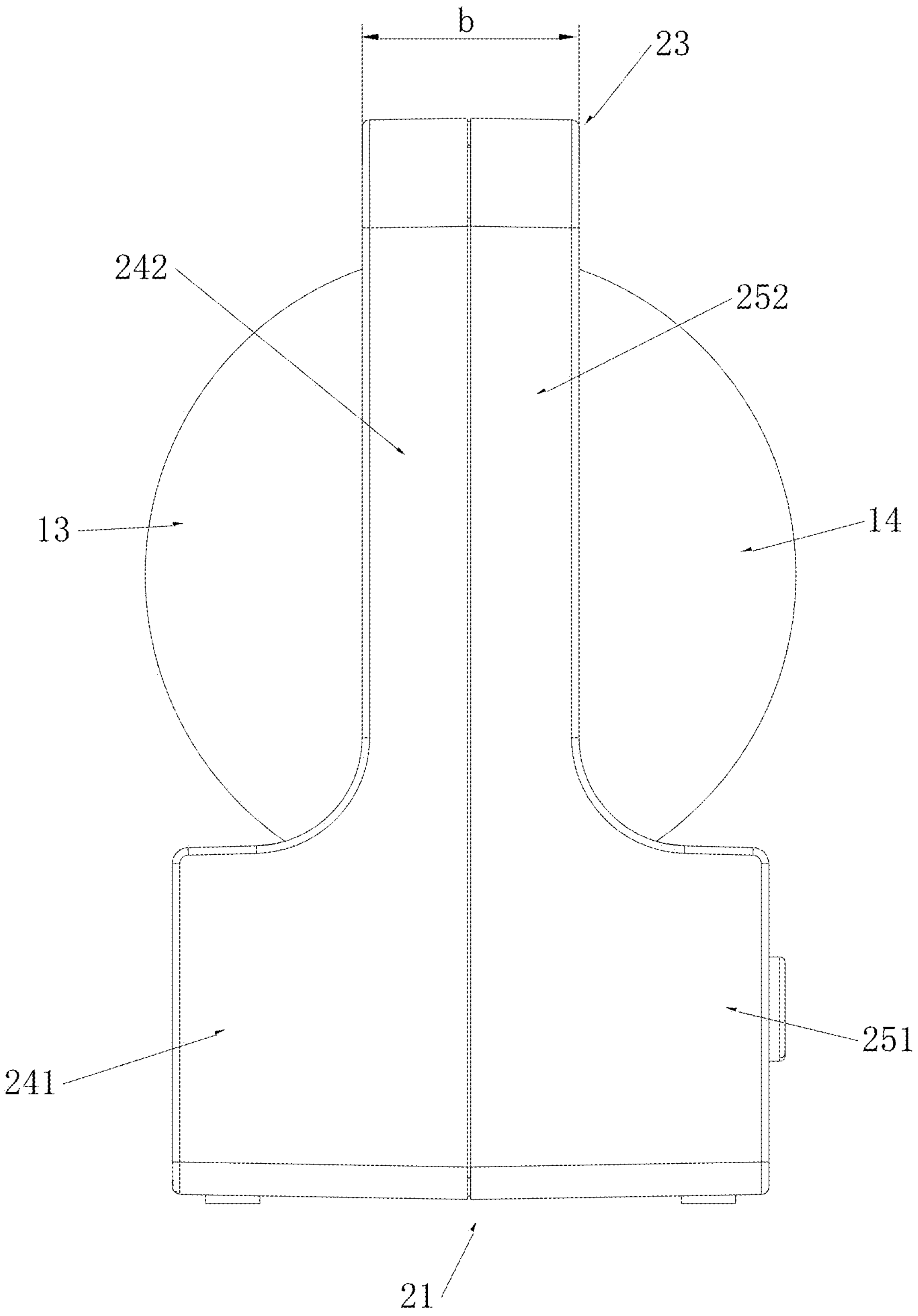
FIG. 3 is a schematic perspective view of the structure of the ornament according to an embodiment of the present disclosure from a third perspective.

Referring to FIG. 3, in an implementation, a thickness b of the connecting ring 23 in the front-rear direction is smaller than a radius of the crystal ball 1, and at least part of at least one of the front portion 13 and a rear portion 14 of the crystal ball 1 extends to the outside of the connecting ring 23, which greatly reduces an area of the crystal ball 1 obscured by the connecting ring 23, i.e., which allows the crystal ball 1 to extend as much as possible to the outside of the connecting ring 23, such that an angle of irradiation of the crystal ball 1 when emitting light can be increased to facilitate the improvement of the luminance, and the display of a pattern inside the crystal ball 1 is also facilitated, thereby improving the decorative effect.

Referring to FIG. 3, in an implementation, at least part of the front portion 13 and at least part of the rear portion 14 of the crystal ball 1 both extend to the outside of the connecting ring 23, such that whether the ornament is positioned forward or backward, a large angle of irradiation of the crystal ball 1 and a completely displayed internal pattern can be ensured.

Referring to FIG. 3, in an implementation, a centerline of the connecting ring 23 in the front-rear direction coincides with a centerline of the crystal ball 1 in the front-rear direction such that a volume of the front portion 13 of the crystal ball 1 extending to the outside of the connecting ring 23 is equal to a volume of the rear portion 14 of the crystal ball 1 extending to the outside of the connecting ring 23, so that whether the ornament is positioned forward or backward, a large angle of irradiation of the crystal ball 1 and a completely displayed internal pattern can be ensured.

Figure 4:
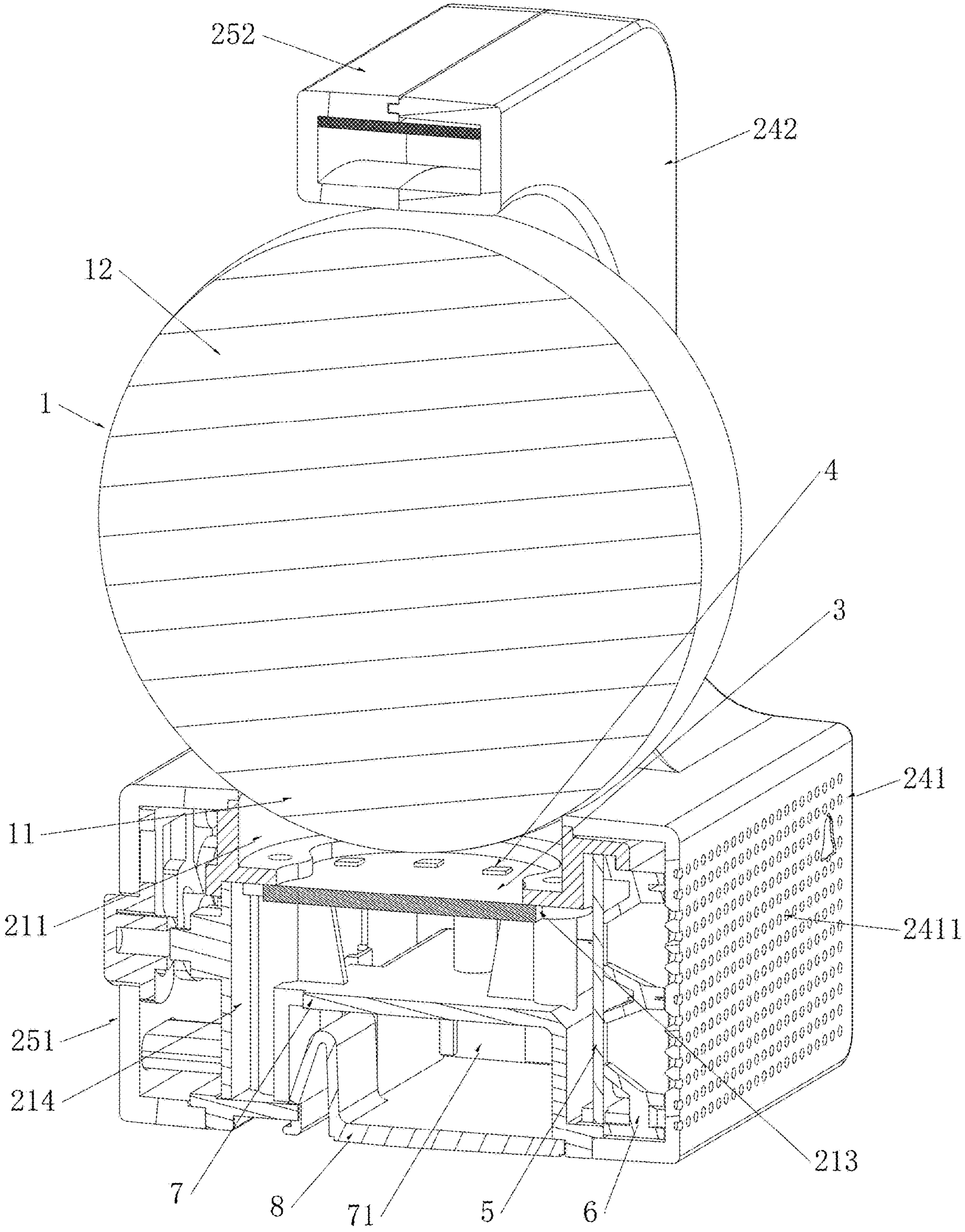
FIG. 4 is a cross-sectional view of the ornament according to an embodiment of the present disclosure.
Figure 5:
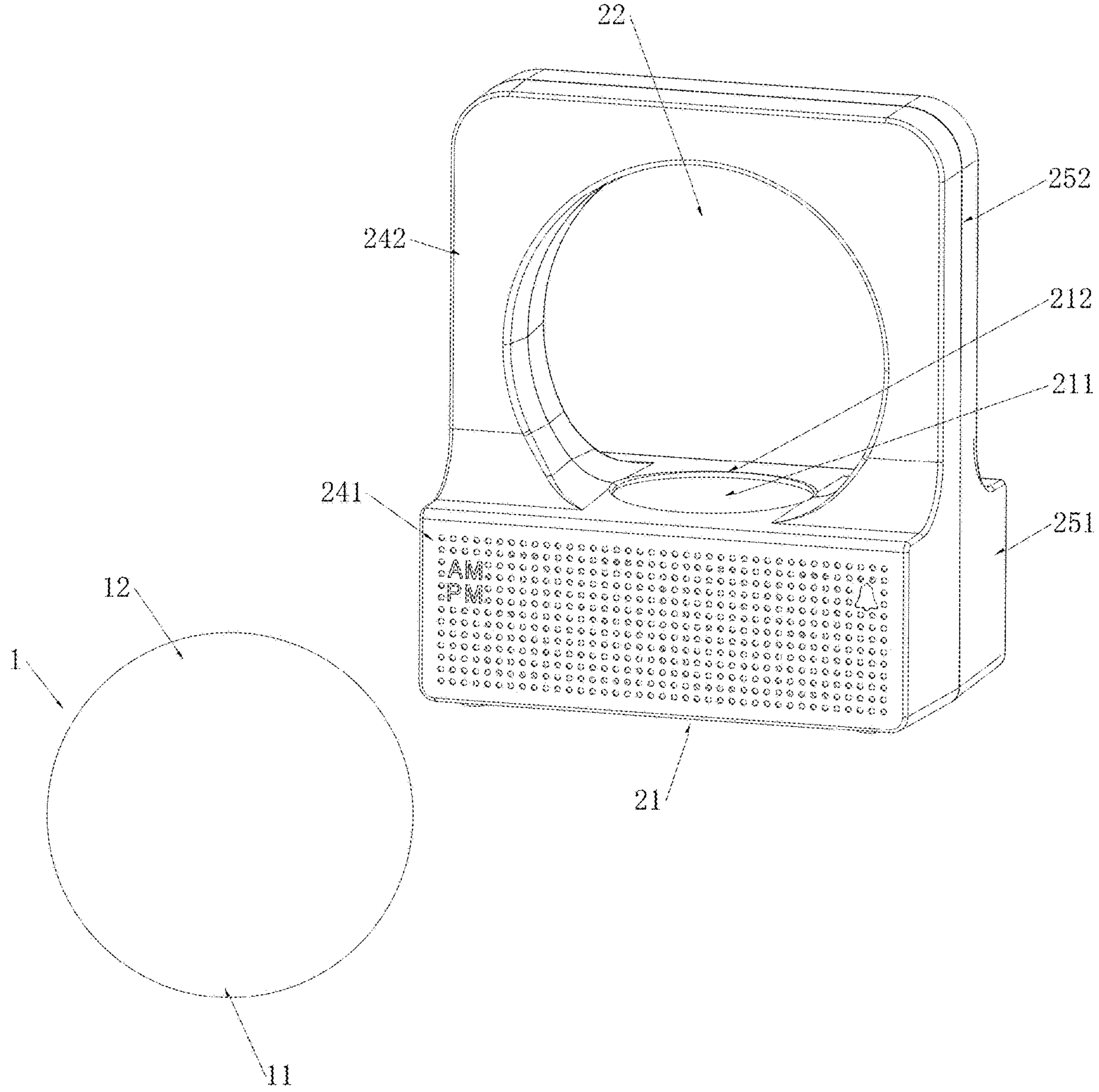
FIG. 5 is an exploded view of the ornament according to an embodiment of the present disclosure.
Figure 6:
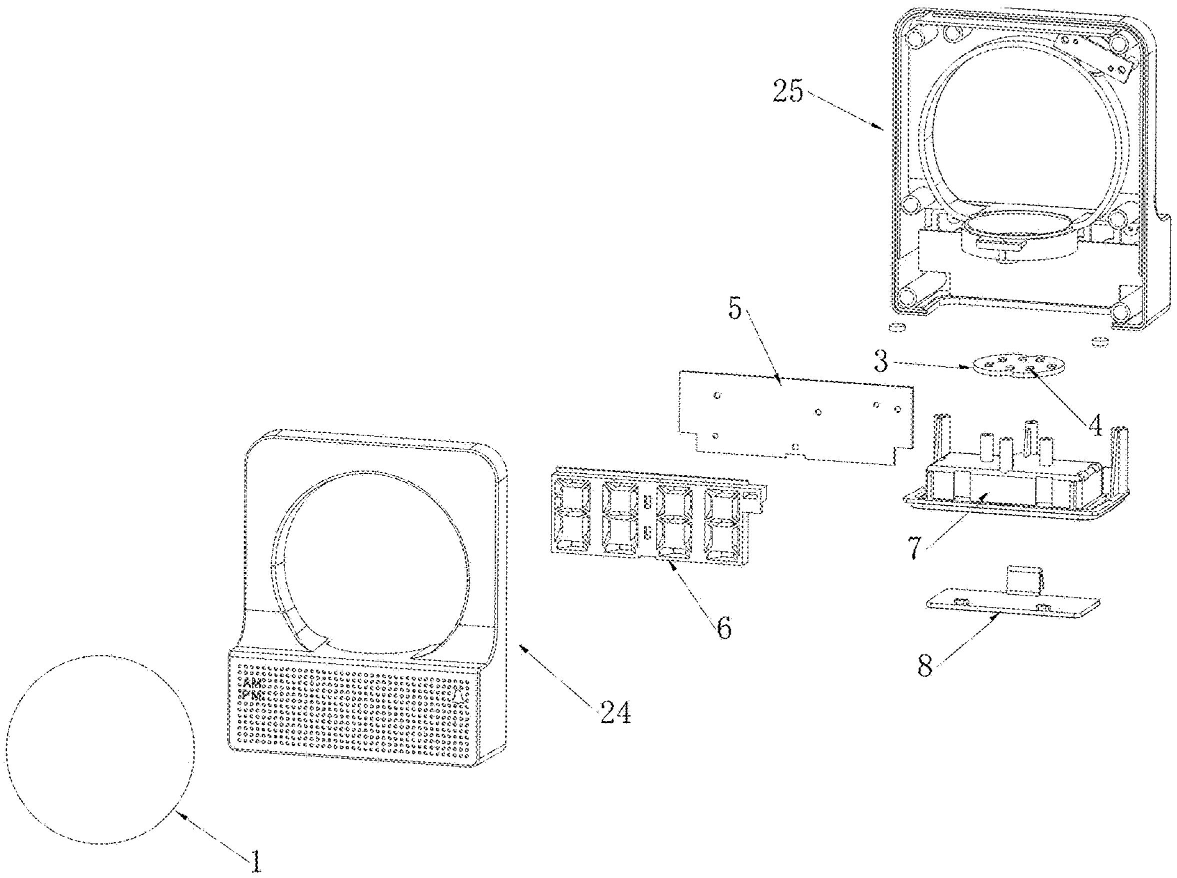
FIG. 6 is an exploded view of the ornament according to an embodiment of the present disclosure.
Figure 7:
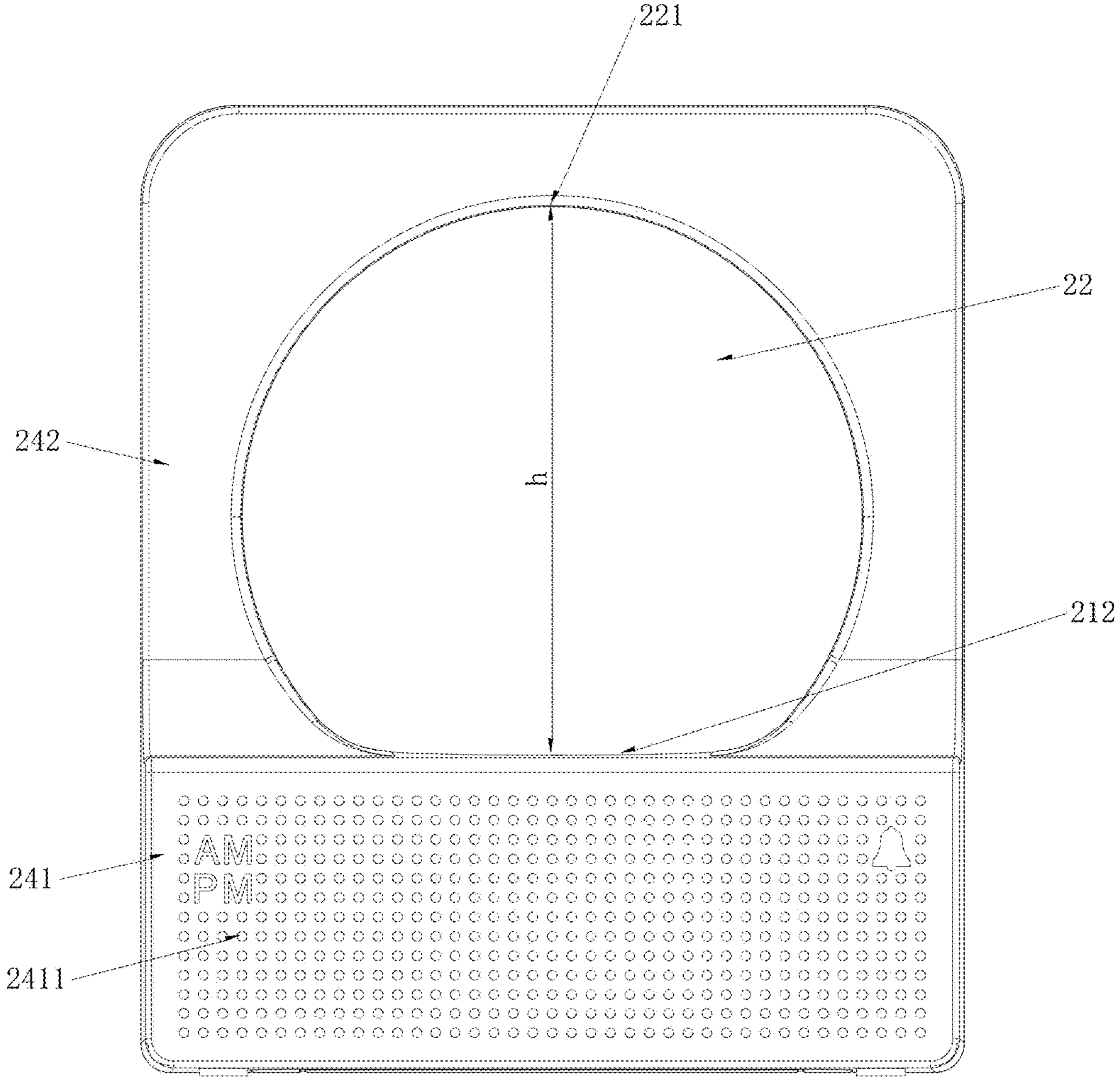
FIG. 7 is a schematic perspective view of the structure of a support seat according to an embodiment of the present disclosure.

Referring to FIGS. 4 and 6, in an implementation, the ornament further includes:

- a first circuit board 3, the first circuit board 3 being arranged in the support seat 2, and the first circuit board 3 being configured to be electrically connected to a power supply; and
- an LED lamp bead 4, the LED lamp bead 4 being electrically connected to the first circuit board 3, the LED lamp bead 4 being located in the bearing recess 211, and the LED lamp bead 4 being arranged opposite to the crystal ball 1, in this way, when the first circuit board 3 is energized, the LED lamp bead 4 is also energized, such that the LED lamp bead 4 is lit, light emitted by the LED lamp bead 4 irradiates onto the crystal ball 1, and the crystal ball 1 absorbs and reflects the light, thereby exciting fluorescent substance inside the crystal ball 1 to emit rays of light, which can provide a decorative effect or can be used as a night-light.

Referring to FIGS. 4 and 6, in an implementation, the ornament further includes:

- a second circuit board 5, the second circuit board 5 being arranged in the support seat 2, and the second circuit board 5 being configured to be electrically connected to the power supply; and
- a display 6, the display 6 being arranged on the support seat 2, and the display 6 being electrically connected to the second circuit board 5 so as to display time under the control of the second circuit board 5. That is, the second circuit board 5 is provided with a clock chip, and when the second circuit board 5 is energized, the display 6 is enabled to display time, causing the ornament to have a clock function, which makes functions more diversified and achieves a multipurpose member, such that the utilization of the ornament is improved, and various use requirements of a user can be met.

In an implementation, the second circuit board 5 is further provided with an alarm clock module, and a control button is arranged on an outer side of the support seat 2. The control button is electrically connected to the second circuit board 5, and is configured to input alarm clock information, and an alarm clock ringing time can be set by operating the control button, causing the ornament to have an alarm clock function, which makes functions more diversified and achieves a multipurpose member, such that the utilization of the ornament is improved, and various use requirements of the user can be met.

In an implementation, the LED lamp bead 4 is an LED lamp bead 4 including three colors of red, green and blue, such that the LED lamp bead 4 can emit three colors of red, green and blue and a combination color of the three colors.

The ornament further includes:

- a controller electrically connected to the first circuit board 3 and the second circuit board 5, the controller being configured to control the LED lamp bead 4 to emit different colors according to a real-time time displayed by the display 6. For example, at 12 p.m., the controller controls the LED lamp bead 4 to emit a red light; at 13 p.m., the controller controls the LED lamp to emit a green light; at 14 p.m., the controller controls the LED lamp to emit a blue light; and so on, so as to provide a reminding effect.

Referring to FIG. 4, in an implementation, the bearing portion 21 has a mounting groove 213, and the first circuit board 3 is arranged in the mounting groove 213 so as to improve the utilization of an internal space of the bearing portion 21 and also to achieve concealment of the first circuit board 3 inside the support seat 2.

Referring to FIG. 4, in an implementation, a battery compartment 71 and a compartment cover 8 are provided at the bottom of the bearing portion 21, the compartment cover 8 being detachably arranged on the bearing portion 21, and the compartment cover 8 covering a bottom opening of the battery compartment 71. A battery (not shown in the figures) can be mounted in the battery compartment 71. The battery is electrically connected to the first circuit board 3 and the second circuit board 5, so as to supply power to the first circuit board 3 and the second circuit board 5, such that the first circuit board 3 and the second circuit board 5 can be supplied with power without a power cord, thereby facilitating movement of the ornament.

In other implementations, the support seat 2 is provided with a power supply wiring terminal electrically connected to the first circuit board 3 and the second circuit board 5, and the power supply wiring terminal is electrically connected to an external power supply via a power cord, such that the power supply to the first circuit board 3 and the second circuit board 5 can also be achieved.

Referring to FIG. 4, in an implementation, the bearing portion 21 further has a mounting cavity 214, and the mounting cavity 214 is in communication with the mounting groove 213.

The ornament further includes:

a battery case 7, the battery case 7 having the battery compartment 71, the battery case 7 being located in the mounting cavity 214, the battery case 7 being connected to the bearing portion 21, and the battery case 7 abutting against the first circuit board 3 so as to tightly press the first circuit board 3 in the mounting groove 213. In this way, the battery case 7 is mounted inside the mounting cavity 214, the battery case 7 is connected to the bearing portion 21, and the battery case 7 abuts against the first circuit board 3, such that the first circuit board 3 is reliably mounted in the mounting groove 213, and a connection-free structure between the first circuit board 3 and the mounting groove 213 is realized, thereby simplifying the structure, and also facilitating the improvement of the assembly efficiency of the ornament and the reduction of the cost of the ornament.

Referring to FIGS. 1-6, in an implementation, the support seat 2 includes:

a front half 24, the front half 24 being provided with a front lower portion 241 and a front upper portion 242; and a rear half 25, the rear half 25 and the front half 24 being arranged in the front-rear direction of the support seat 2, the rear half 25 being connected to the front half 24, and the rear half 25 being provided with a rear lower portion 251 and a rear upper portion 252. The rear lower portion 251 and the front lower portion 241 form the bearing portion 21. The rear lower portion 251 and the front lower portion 241 enclose the mounting cavity 214. One of the rear lower portion 251 and the front lower portion 241 is a light-transmitting member or is provided with light-transmitting holes 2411, and the light-transmitting holes 2411 are in communication with the mounting cavity 214, such that time displayed by the display 6 can be displayed on the outer side of the support seat 2 through the light-transmitting holes 2411. The rear upper portion 252 and the front upper portion 242 form the connecting ring 23, and the connecting ring 23 and the bearing portion 21 enclose the mounting hole 22.

The first circuit board 3, the second circuit board 5 and the display 6 are all located inside the mounting cavity 214. That is, the support seat 2 is of a structure composed of the front half 24 and the rear half 25 which are separately arranged. During mounting, the first circuit board 3, the LED lamp bead 4, the second circuit board 5, the display 6, and the battery case 7 can all be first mounted on the corresponding parts of the front half 24 and the rear half 25, and then the front half 24 and the rear half 25 are connected together, which greatly reduces the mounting difficulty of the first circuit board 3, the LED lamp bead 4, the second circuit board 5, the display 6, the battery case 7, etc., thereby improving the assembly efficiency of the ornament and facilitating the further reduction of the cost of the ornament.

In an implementation, the front half 24 and the rear half 25 can be connected to each other by means of engagement (i.e., by means of snap-fit connection, for example, a male engagement portion is provided on one of the front half 24 and the rear half 25, a female engagement portion is provided on the other thereof, and the female engagement portion engages with the male engagement portion), such that a reliable connection between the front half 24 and the rear half 25 is ensured, and a tool-less connection between the front half 24 and the rear half 25 is also enabled, thereby facilitating the further improvement of the assembly efficiency of the ornament and thus further reducing the cost of the ornament.

In other implementations, the front half 24 and the rear half 25 can be connected to each other by means of a fastener, such as a bolt, a screw, a rivet, etc., and can also be bonded together by means of an adhesive.

In the description of this specification, descriptions with reference to the terms such as "an embodiment", "some embodiments", "example", "specific example", or "some examples" mean that specific features, structures, materials, or characteristics described with reference to the embodiment or example are included in at least one embodiment or example of the present disclosure. Moreover, the specific features, structures, materials or characteristics described can be combined in any one or more embodiments or examples in any suitable manner. In addition, without any contradiction, those skilled in the art may incorporate and combine different embodiments or examples and features of the different embodiments or examples described in this specification.

In addition, the terms "first" and "second" are used for descriptive purposes only, and cannot be construed as indicating or implying relative importance or implicitly indicating the number of technical features indicated. Thus, the features defined with "first" and "second" may explicitly or implicitly include at least one of the features. In the description of the present disclosure, the meaning of "a plurality of" is two or more, unless explicitly and specifically defined otherwise.

The above descriptions are merely specific implementations of the present disclosure, but are not intended to limit the scope of protection of the present disclosure. Any variation or replacement readily figured out by those skilled in the art within the technical scope disclosed in the present disclosure shall fall within the scope of protection of the present disclosure. Therefore, the scope of protection of the present disclosure shall be subject to the scope of protection of the claims.

The invention claimed is:

1. An ornament, comprising:

a crystal ball; and a support seat, the support seat being provided with a bearing portion, and a bearing recess and a mounting opening being provided in the top of the bearing portion, wherein the bearing recess allows insertion of at least part of a lower portion of the crystal ball to bear the crystal ball, and the mounting opening is located at the top of the bearing recess, is in communication with the bearing recess, and allows at least part of the lower portion of the crystal ball to enter and exit the bearing recess vertically; and the support seat having a mounting hole running through the support seat from front to rear, wherein the mounting hole is located above the bearing recess, is in communication with the bearing recess via the mounting opening, and receives a remaining portion of the crystal ball exposed from the bearing recess, a distance between a hole wall part of the mounting hole at the highest point and the mounting opening being smaller than a diameter of the crystal ball.

2. The ornament according to claim 1, wherein the mounting hole has a larger diameter than the crystal ball, and the mounting hole is capable of allowing the crystal ball to enter and exit laterally from the support seat.

3. The ornament according to claim 1, wherein the support seat is further provided with a connecting ring, the connecting ring is arranged on the top of the bearing portion and arranged around an axial centerline of the mounting hole, and the connecting ring and the bearing portion enclose the mounting hole.

4. The ornament according to claim 3, wherein a thickness of the connecting ring in a front-rear direction is smaller than a radius of the crystal ball, and at least part of at least one of a front portion and a rear portion of the crystal ball extends to the outside of the connecting ring.

5. The ornament according to claim 4, wherein at least part of the front portion and at least part of the rear portion of the crystal ball both extend to the outside of the connecting ring.

6. The ornament according to claim 1, further comprising:

a first circuit board arranged in the support seat, the first circuit board being configured to be electrically connected to a power supply; and an LED lamp bead electrically connected to the first circuit board, the LED lamp bead being located in the bearing recess and arranged opposite to the crystal ball.

7. The ornament according to claim 6, further comprising:

a second circuit board arranged in the support seat, the second circuit board being configured to be electrically connected to the power supply; and a display arranged on the support seat, the display being electrically connected to the second circuit board so as to display time under the control of the second circuit board.

8. The ornament according to claim 6, wherein the bearing portion has a mounting groove, and the first circuit board is arranged in the mounting groove.

9. The ornament according to claim 8, wherein a battery compartment and a compartment cover are provided at the bottom of the bearing portion, the compartment cover being detachably arranged on the bearing portion and covering a bottom opening of the battery compartment.

10. The ornament according to claim 9, wherein the bearing portion further has a mounting cavity in communication with the mounting groove; and the ornament further comprises:

a battery case having the battery compartment, the battery case being located in the mounting cavity, being connected to the bearing portion, and abutting against the first circuit board so as to tightly press the first circuit board in the mounting groove.

* * * * *